(12) United States Patent
Miguel Sánchez

(10) Patent No.: US 11,821,790 B2
(45) Date of Patent: Nov. 21, 2023

(54) SELF-CALIBRATING SPECTRAL SENSOR MODULES

(71) Applicant: ams Sensors Singapore Pte. Ltd., Singapore (SG)

(72) Inventor: Javier Miguel Sánchez, Zurich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 140 days.

(21) Appl. No.: 17/433,793

(22) PCT Filed: Mar. 25, 2020

(86) PCT No.: PCT/SG2020/050162
§ 371 (c)(1),
(2) Date: Aug. 25, 2021

(87) PCT Pub. No.: WO2020/197497
PCT Pub. Date: Oct. 1, 2020

(65) Prior Publication Data
US 2022/0136898 A1  May 5, 2022

Related U.S. Application Data

(60) Provisional application No. 62/824,678, filed on Mar. 27, 2019.

(51) Int. Cl.
*G01J 3/02* (2006.01)
*G01J 3/10* (2006.01)
*G01J 3/28* (2006.01)

(52) U.S. Cl.
CPC ......... *G01J 3/027* (2013.01); *G01J 2003/102* (2013.01); *G01J 2003/2879* (2013.01)

(58) Field of Classification Search
CPC ................. G01J 3/027; G01J 2003/102; G01J 2003/2879; G01J 3/28; G01J 3/42;
(Continued)

(56) References Cited

U.S. PATENT DOCUMENTS 6,465,799 B1 * 10/2002 Kimble .................. G02B 5/208
250/455.11
8,441,642 B2 * 5/2013 Wegmuller ............... G01J 3/02
356/420

(Continued)

OTHER PUBLICATIONS

International Search Report and Written Opinion for Application No. PCT/SG2020/050162 dated Jun. 19, 2020 (12 pages).

*Primary Examiner* — Abdullahi Nur
(74) *Attorney, Agent, or Firm* — Michael Best & Friedrich LLP

(57) ABSTRACT

An example system includes a first light source, a second light source, a photodetector, and an electronic control device. The electronic control device is operable to cause the first light source to emit first light within a range of wavelengths towards a subject, and measure, using the photodetector, the first light reflected from the subject. The electronic control device is also operable to cause the second light source to emit second light including a plurality of emission peaks within the range of wavelengths, and measure, using the photodetector, the second light. The electronic control device is also operable to determine spectral information regarding the subject based on the measured first light and the measured second light.

20 Claims, 8 Drawing Sheets

(58) Field of Classification Search
CPC ........ G01J 3/45; G01J 2003/2866; G01J 3/10; G01J 3/00; G01J 3/02
See application file for complete search history.

(56) References Cited

U.S. PATENT DOCUMENTS

| | | | |
|---|---|---|---|
| 8,711,362 B2* | 4/2014 | Funamoto | G01J 3/32 356/454 |
| 9,360,366 B1 | 6/2016 | Tran | |
| 10,004,399 B2* | 6/2018 | Anikanov | A61B 5/0075 |
| 2004/0069942 A1* | 4/2004 | Fujisawa | G01N 21/3577 250/269.1 |
| 2014/0016128 A1* | 1/2014 | Kawanago | G01J 3/42 356/319 |
| 2014/0168636 A1 | 6/2014 | Funamoto | |
| 2018/0128680 A1* | 5/2018 | Kim | G01J 3/10 |

\* cited by examiner

SELF-CALIBRATING SPECTRAL SENSOR MODULES

TECHNICAL FIELD

The disclosure relates to spectral sensor modules for use in spectrometers.

BACKGROUND

A spectrometer is an instrument used to measure a light spectrum of sample light (e.g., to determine the spectral components of ultraviolet, visible, and/or infrared light). In some implementations, spectrometers can determine the intensity of light as a function of wavelength or of frequency.

Spectrometers can be used for a variety of different applications. For example, spectrometers can be used to conduct environmental analyses, industrial monitoring, color measurements, and pharmacological studies.

A light spectrum can be measured in different ways, such as through direct measurement or indirect measurement. As an example, a spectrometer configured for direct measurement can separate different wavelengths of light spatially (e.g., using wavelength dispersive devices, such as diffractive gratings or prisms), and measure the power distribution of each wavelength of light individually (e.g., to "directly" measure the spectrum with respect to specific wavelengths).

As another example, a spectrometer configured for indirect measurement can modulate light according to a series of known spectral modulation patterns, and obtain measurements of the modulated light. Each measurement provides information carried by multiple wavelengths and according to different weights, and can be used to reconstruct the spectrum of the original light (e.g., using a multiplexing technique).

SUMMARY

A spectrometer system can be used to determine information regarding a sample (e.g., an object) based on the properties of light reflected from and/or transmitted through the sample. As an example, a spectrometer system can include a light source that emits light (e.g., light having known spectral properties) toward the sample, and a detector that measures light reflected from and/or transmitted through the sample. The spectrometer system can determine the spectral properties of the reflected and/or transmitted light (e.g., the distribution of light with respect to a range of wavelengths), and determine information regarding the sample based on these measurements. As an example, the spectrometer system can determine the physical shape or profile of the sample, the characteristics of the surface of the sample, and/or the composition of the sample.

In some implementations, a spectrometer system can measure light according to a specific wavelength or range of wavelengths. This can be useful, for example, as light measurements with respect to certain wavelengths or ranges of wavelengths may be particularly useful in determining the properties of the sample (e.g., compared to light measurement with respect to other wavelengths or ranges of wavelengths). Accordingly, the spectrometer system can selectively measure light within specific wavelengths or ranges of wavelengths (e.g., those that provide more information and/or more desirable information regarding the sample), while not measuring light within other wavelengths or ranges of wavelengths (e.g., those that provide less information and/or less desirable information regarding the sample) to improve the efficiency and accuracy of measurements.

In some implementations, a spectrometer system can measure light according to a specific wavelength or range of wavelengths using an interferometer. An interferometer is a device that uses light interference (e.g., by super-positioning light waves) to extract information from the light. As an example, an interferometer can receive reflected and/or transmitted light from a sample, and through a super-positioning of the received light according to different phases, selectively transmit a subset of the light having a particular wavelength or range of wavelengths to the detector for measurement. Accordingly, the detector does not measure the entirety of the light received from the sample, but rather a limited subset of the received light that is selectively transmitted by the interferometer.

In some implementations, an interferometer can be "tunable," such that a system or user can specify a particular wavelength or ranges of wavelengths of light that is transmitted by the interferometer for measurement. As an example, the output of a tunable interferometer can depend on an input voltage that is applied to the interferometer. The input voltage can be varied to adjust the wavelength or range of wavelengths of light that is selectively transmitted by the interferometer to the detector for measurement.

However, in some implementations, the output of an interferometer can also depend on other factors, such as the temperature of the surrounding environment. Further, the output of an interferometer can vary over the lifetime of the interferometer. As an example, the output of an interferometer can vary due to oxidation of one or more components (e.g., a mirror of the interferometer), which can alter the performance of the interferometer over time (e.g., cause a drift in the nominal central nominal wavelength outputted by the interferometer, alter the effective length of the cavity of the interferometer, etc.). As another example, water-intake in materials of the interferometer over time can create additional strain to components of the interferometer, causing physical changes that can alter the performance of the interferometer over time (e.g., bending due to increased volume). As another example, some material may lose volume over time, resulting in a change in the mechanical disposition of the interferometer and a corresponding change in performance.

Accordingly, in response to a particular input voltage, an interferometer may output light within different wavelengths or ranges of wavelengths (e.g., due to temperature fluctuations in the surrounding environment, the age of the device, etc.). These variations can reduce the accuracy and/or precision of a spectrometer system's measurements, particularly when the spectrometer system is used in different environments and/or in an unregulated environment.

To enhance its performance, the spectrometer system can obtain reference measurements of light having a known spectral distribution, and calibrate sample measurements based on the reference measurements. As an example, the spectrometer system can include a light source that emits reference light having a known spectral distribution (e.g., light having one or more known intensity peaks corresponding to one or more known frequencies in the frequency domain). The spectrometer system can measure the reference light (e.g., using an interferometer and a detector), and compare the measurements against the known properties of the reference light. If there are any discrepancies (e.g., the measured intensity peaks do not align with the known intensity peaks of the reference light), the spectrometer system can calibrate the measurement data such that it better reflects the known properties of the reference light (e.g., using one or more mathematical fitting algorithms or techniques). Similarly, these calibrations can be performed with respect to one or more sample measurements to improve the accuracy and/or precision of a spectrometer system's sample measurements.

In some implementations, this self-calibration technique enables the spectrometer system to compensate for fluctuations in temperature and performance, and enables the spectrometer system to make more accurate and/or precise measurements. Further, this self-calibration technique can enable the spectrometer system to be used in a wider range of environments and environmental conditions, and extends the effective operational lifetime of the spectrometer system.

In an aspect, a system includes a first light source, a second light source, a photodetector, and an electronic control device. The electronic control device is operable to cause the first light source to emit first light within a range of wavelengths towards a subject, and measure, using the photodetector, the first light reflected from the subject. The electronic control device is also operable to cause the second light source to emit second light including a plurality of emission peaks within the range of wavelengths, and measure, using the photodetector, the second light. The electronic control device is also operable to determine spectral information regarding the subject based on the measured first light and the measured second light, Implementations of this aspect can include one or more of the following features.

In some implementations, the first light can be broadband light.

In some implementations, the wavelengths of the plurality of emission peaks can be evenly distributed.

In some implementations, the electronic control device can be operable to determine the spectral information regarding the subject by identifying one or more emission peaks of the plurality of emission peaks in the measured second light, and transforming a representation of the measured first light based on the identified one or more emission peaks.

In some implementations, the representation of the measured first light can include a data record indicating spectral components of the measured first light.

In some implementations, the electronic control device can be operable to determine the spectral information regarding the subject by determining a difference between the measured second light and the measured first light, and transforming a representation of the measured first light based on the difference.

In some implementations, the representation of the measured first light can include a data record indicating spectral components of the measured first light.

In some implementations, the electronic control device can be operable to cause the second light source to emit the second light towards the subject, and measure, using the photodetector, the second light reflected from the subject.

In some implementations, the electronic control device can be operable to cause the second light source to emit the second light towards a light guide optically coupled to the photodetector, and measure, using the photodetector, the second light emitted from the light guide.

In some implementations, the second light source can include one or more dielectric coating filters and a broadband light emitting element.

In some implementations, the broadband light emitting element can include an incandescent lamp.

In some implementations, the system can further include a host device. The first light source, the second light source, the photodetector, and the electronic control device can be disposed, at least in part, in the host device.

In some implementations, the host device can be at least one of a smart phone or a wearable device.

In another aspect, a method includes emitting first light within a range of wavelengths towards a subject, and measuring the first light reflected from the subject. The method also includes emitting second light, the second light including a plurality of emission peaks within the range of wavelengths, and measuring the second light. The method also includes determining, based on the measured first light and the measured second light, spectral information regarding the subject.

Implementations of this aspect can include one or more of the following features.

In some implementations, the first light can be broadband light.

In some implementations, the wavelengths of the plurality of emission peaks can be evenly distributed.

In some implementations, determining the spectral information regarding the subject can include identifying one or more emission peaks of the plurality of emission peaks in the measured second light, and transforming a representation of the measured first light based on the identified one or more emission peaks.

In some implementations, the representation of the measured first light can include a data record indicating spectral components of the measured first light.

In some implementations, determining the spectral information regarding the subject can include determining a difference between the measured second light and the measured first light, and transforming a representation of the measured first light based on the difference.

In some implementations, the representation of the measured first light can include a data record indicating spectral components of the measured first light.

In some implementations, emitting second light can include emitting the second light towards the subject. Measuring the second light can include measuring the second light reflected from the subject.

In some implementations, emitting second light can include emitting the second light towards a light guide. Measuring the second light can include measuring the second light emitted from the light guide.

The details of one or more implementations are set forth in the accompanying drawings and the description below. Other features and advantages will be apparent from the description and drawings, and from the claims.

DETAILED DESCRIPTION

This disclosure describes implementations of a spectrometer system for measuring the spectral distribution of light reflected from and/or transmitted through a sample. Implementations of the spectrometer system include a voltage-tunable interferometer for selecting particular wavelengths or ranges of wavelengths of light for measurement. To account for variations in the output of the interferometer (e.g., due to fluctuations in the ambient temperature, the age of the system, etc.), the spectrometer system can obtain measurements of reference light having a known spectral distribution (e.g., light having one or more known intensity peaks corresponding to one or more known frequencies in the frequency domain), and calibrate sample measurements based on the measurements of reference light. In some implementations, this enables the spectrometer system to compensate for variations in operation, and enables the spectrometer system to make more accurate and/or precise measurements. Further, this self-calibration technique can enable the spectrometer system to be used in a wider range of environments and environmental conditions, and extends the effective operational lifetime of the spectrometer system.

Figure 1:
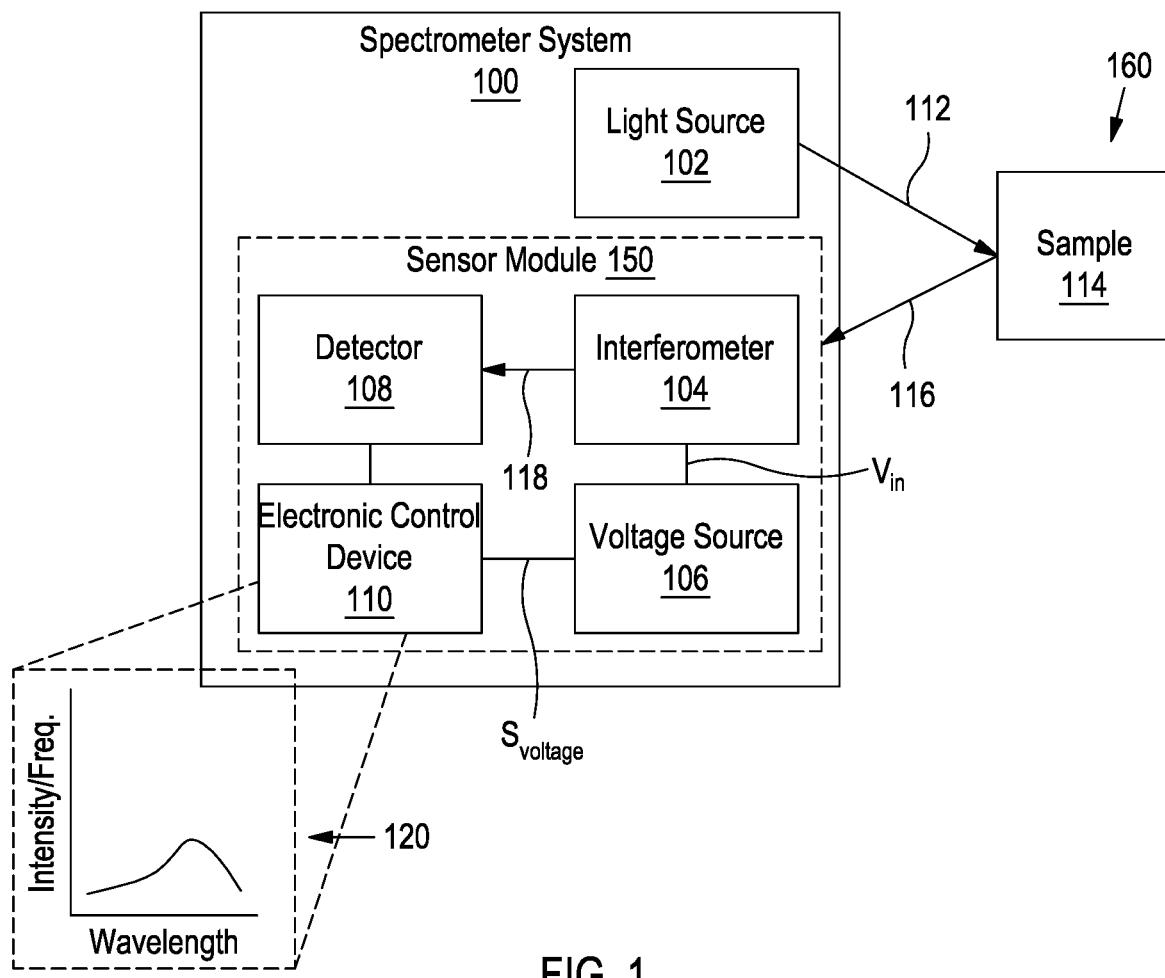
FIG. 1 is schematic diagram of an example spectrometer system.

FIG. 1 shows an example spectrometer system 100. The spectrometer system 100 can be implemented as a stand-alone device (e.g., as an individual instrument), or as part of another device (e.g., as a part of a multi-purpose device). In some implementations, the spectrometer system 100 can be implemented as a part of a mobile device, such as a smart phone, a tablet computer, or a wearable computer.

As shown in FIG. 1, the spectrometer system 100 includes a light source 102 and a sensor module 150 having an interferometer 104, a voltage source 106, a detector 108, and an electronic control device 110. In an example usage of the spectrometer system 100, the light source 102 generates light 112, which is emitted towards a sample 114 (e.g., an object positioned in a sample region 160). At least some of the sample light 116 reflected by and/or transmitted through the sample 114 becomes incident on the interferometer 104. Based on an input voltage generated by the voltage source 106, the interferometer 104 selectively transmits a subset of the sample light 118 (e.g., sample light within a particular wavelength or range of wavelengths) to the detector 108. The detector 108 measures the characteristics of the subset of the sample light 118, and provides the measurements the electronic control device 110. Based on the measurements, the electronic control device 110 determines information regarding the sample 114 (e.g., a histogram 120 representing the spectral distribution of the subset of the sample light 118, characteristics of the sample 114, etc.).

The light source 102 is a component operable to generate light and emit the light toward the sample region 160. The light source 102 can include one or more light emitting elements. As an example, the light source 102 can include one or more incandescent lamps, light emitting diodes (LEDs), vertical cavity surface emitting lasers (VCSELs), organic light emitting diodes (OLEDs), or other devices that selectively generate light.

The interferometer 104 is a component operable to extract information from light using light interference. As an example, the interferometer can receive the sample light 116, and through a super-positioning of the sample light 116 according to different phases, selectively transmit the subset of the sample light 118 having a particular wavelength or range of wavelengths to the detector 108 for measurement. The interferometer 104 is "tunable," such that a system or user can specify a particular wavelength or ranges of wavelengths of light that is transmitted by the interferometer 104 to the detector 108. As an example, the output of the interferometer 104 can depend on an input voltage $V_{in}$ that is generated by the voltage source 106 and applied to the interferometer 104. The input voltage $V_{in}$ can be varied to adjust the wavelength or range of wavelengths of light that is selectively transmitted by the interferometer 104 to the detector 108. In some implementations, the interferometer 104 can include one or more micro-electro-mechanical systems (MEMS)-based tunable Fabry-Pérot (FI) interferometers.

The voltage source 106 is a component operable to generate the input voltage $V_{in}$. The voltage source 106 can include one or more digital and/or analog circuit components for generating voltage. In some implementations, the voltage source 106 can include one or more batteries or electric generators. In some implementations, the voltage source 106 can receive electric energy from an external source (e.g., an external power supply), and generate the input voltage $V_{in}$ using the received electric energy. In some implementations, the voltage source 106 can be communicatively coupled to the electronic control device 110, and can generate an input voltage $V_{in}$ having a particular voltage value based on command signals $s_{voltage}$ received from the electronic control device 110. Although FIG. 1 depicts the voltage source 106 as a part of the sensor module 150, in some implementations, the voltage source 106 can be implemented as a separate component (e.g., as a part of the spectrometer system 100 or another device).

The detector 108 is a component operable to measure the characteristics of the subset of sample light 118 received form the interferometer 104. In some implementations, the detector 108 can include one or more photodetectors or other light sensitive sensors. The detector 108 can measure various characteristics of the subset of sample light 118. As an example, the detector 108 can measure the intensity of the light and/or the spectral characteristics of the reflected light with respect to certain wavelengths and/or ranges of wavelengths. In some implementations, the detector 108 is operable to measure the subset of sample light 118 according to one or more discrete points in time. In some implementations, the detector 108 is operable to measure light continuously, periodically, intermittently, or according to some other pattern.

The electronic control device 110 is a component operable to control one or more functions of the spectrometer system 100. For example, the electronic control device 110 can be communicatively coupled to the light source 102, and can send command signals to the light source 102 to selectively turn on or off the light source 102 (e.g., to generate light during selected periods of time, such as during a measurement operation) and/or specify the characteristics of the generated light (e.g., to generate light according to a specific pattern, spectral composition, etc.). As another example, the electronic control device 110 can be communicatively coupled to the voltage source 106, and can send command signals $s_{voltage}$ to the voltage source 106 to generate an input voltage $V_{in}$ having a particular voltage value (e.g., to tune the output of the interferometer 104). As another example, the electronic control device 110 can be communicatively coupled to the detector 108, and can obtain measurements from the detector 108.

Further, the electronic control device 110 can determine information from the sample 114 based on the measurements. For example, the electronic control device 110 can generate a histogram 120 representing the spectral distribution of the subset of the sample light 118. As another example, the electronic control device 110 can determine other characteristics of the sample 114 based on the measurements, such as the physical shape or profile of the sample, the characteristics of the surface of the sample, and/or the composition of the sample.

In some implementations, the electronic control device 110 can be implemented in conjunction with one or more of the other components of the spectrometer system 100 and/or the sensor module 150 (e.g., as a single integrated device). In some implementations, the electronic control device 110 can be implemented as a device separate from one or more of the other components of the spectrometer system 100 and/or the sensor module 150. For example, the electronic control device 110 can be a computer system (e.g., a client computer system or a server computer system) or computer processor separate and distinct from one or more of the other components of the spectrometer system 100 and/or the sensor module 150.

As described above, the output of the interferometer 104 can depend on the input voltage $V_{in}$ that is applied to the interferometer 104. The input voltage $V_{in}$ can be varied to adjust the wavelength or range of wavelengths of light that is selectively transmitted by the interferometer 104 to the detector 108.

Figure 2A:
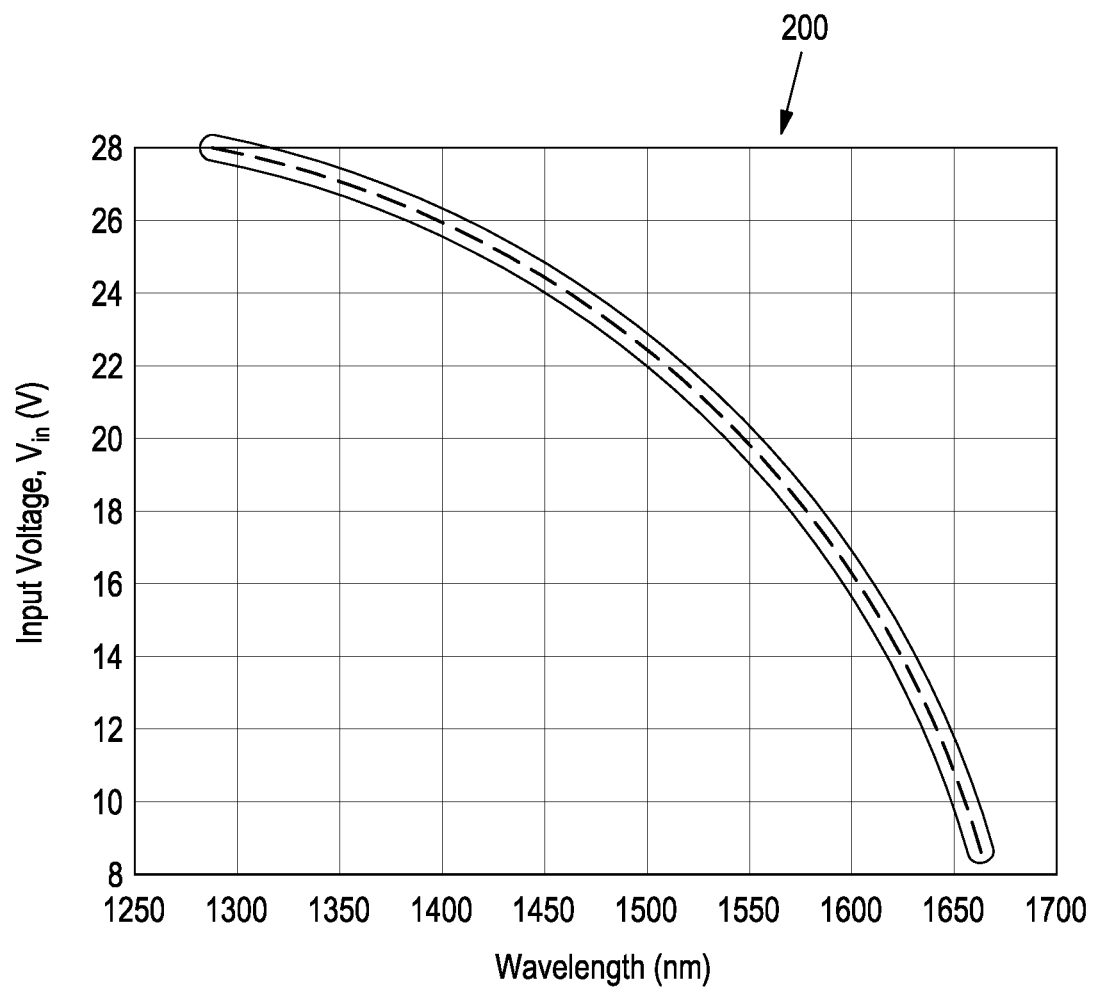
FIG. 2A is a plot showing an example relationship between the input voltage applied to an interferometer and a corresponding wavelength of light outputted by the interferometer.

In some implementations, the relationship between the input voltage $V_{in}$ applied to an interferometer and the corresponding wavelength of light outputted by the interferometer is non-linear. For instance, FIG. 2A includes a plot 200 showing a relationship between the input voltage $V_{in}$ applied to the interferometer 104 and the corresponding wavelength of light outputted by the interferometer 104 for a spectrometer system including an example MEMS-based tunable FI interferometer. In this example, applying an input voltage $V_{in}$ to the interferometer 104 would result in the output of light having a range of wavelengths with a center wavelength of approximately 1550 nm, while other wavelengths of light outside of the range are substantially not output by the interferometer. In this example, the relationship can be approximated by the equation:

$$V^2 = \left[\frac{2k}{\varepsilon_0 \varepsilon_a A} x(T-x)^2\right],$$

where k is a spring constant, x is the wavelength change (e.g., a displacement of the cavity of the interferometer), $\varepsilon_0$ is the vacuum permittivity, $\varepsilon_a$ is that relative static permittivity, A is the area of the equal parallel plates of the interferometer, V is the voltage applied between the electrodes, and T is a parameter related to the geometry and the electrical permittivity of the media under consideration $$(e.g., T = g - t_d\left(1 - \frac{\varepsilon_a}{\varepsilon_b}\right),$$

where g is a thickness of the cavity with no applied voltage, and $t_d$ is the thickness of the layer on top of the electrode, with a relative static permittivity of $\varepsilon_b$).

However, in some implementations, the output of an interferometer can also depend on the temperature of the surrounding environment. Accordingly, in response to a particular input voltage, an interferometer may output light within different wavelengths or ranges of wavelengths due to temperature fluctuations in the surrounding environment. These variations can reduce the accuracy and/or precision of a spectrometer system's measurements, particularly when the spectrometer system is used in different environments and/or in an unregulated environment. For example, although an electronic control device 110 may specify that a certain wavelength of light be transmitted to the detector 108 for measurement, a different wavelength of light might be transmitted instead, resulting in variations in the measurements and/or errors in the interpretation of those measurements.

Figure 2B:
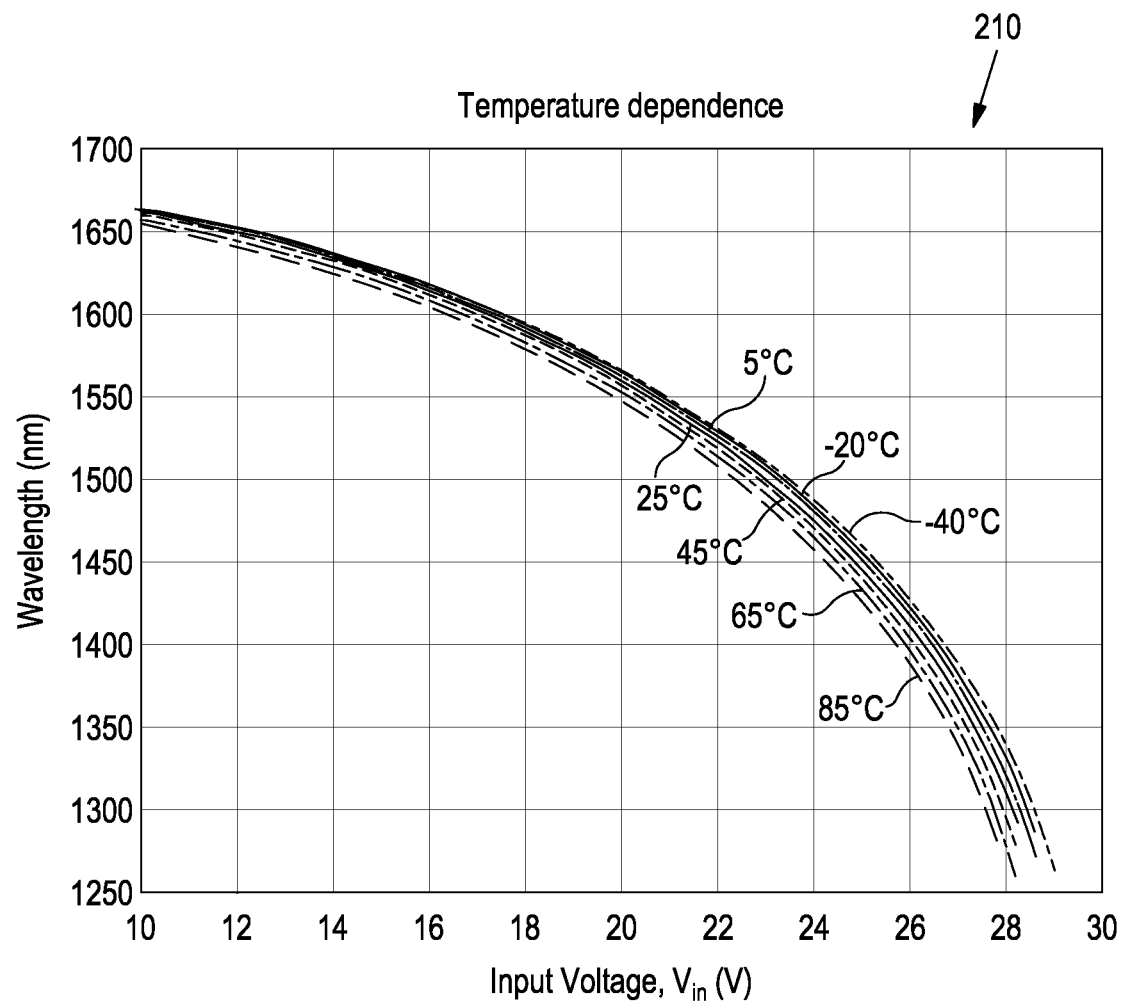
FIG. 2B is a plot showing an example relationship between the input voltage applied to an interferometer and a corresponding wavelength of light outputted by the interferometer with respect to several different temperatures.

As an example, FIG. 2B shows a plot 210 depicting a relationship between (i) the input voltage $V_{in}$ applied to the interferometer 104, and (ii) the corresponding center wavelength of the range of wavelengths of light outputted by the interferometer 104 with respect to 7 different temperatures ranging from −40° C. and 85° C. (−40° C., −20° C., 5° C., 25° C., 45° C., 65° C., and 85° C.). As shown in FIG. 2B, in response to a particular input voltage $V_{in}$, an interferometer may output light within different ranges of wavelengths, depending on the temperature. Thus, the resulting measurements may vary due to temperature fluctuations during and between each measurement.

Further, in some implementations, the output of an interferometer can vary over the lifetime of the interferometer. For example, as the interferometer ages, the relationship between the input voltage the input voltage $V_{in}$ applied to the interferometer 104 and the corresponding center wavelength of the range of wavelengths of light outputted by the interferometer 104 can shift or "drift." Thus, the resulting measurements may vary due to the age of the device.

Figure 3:
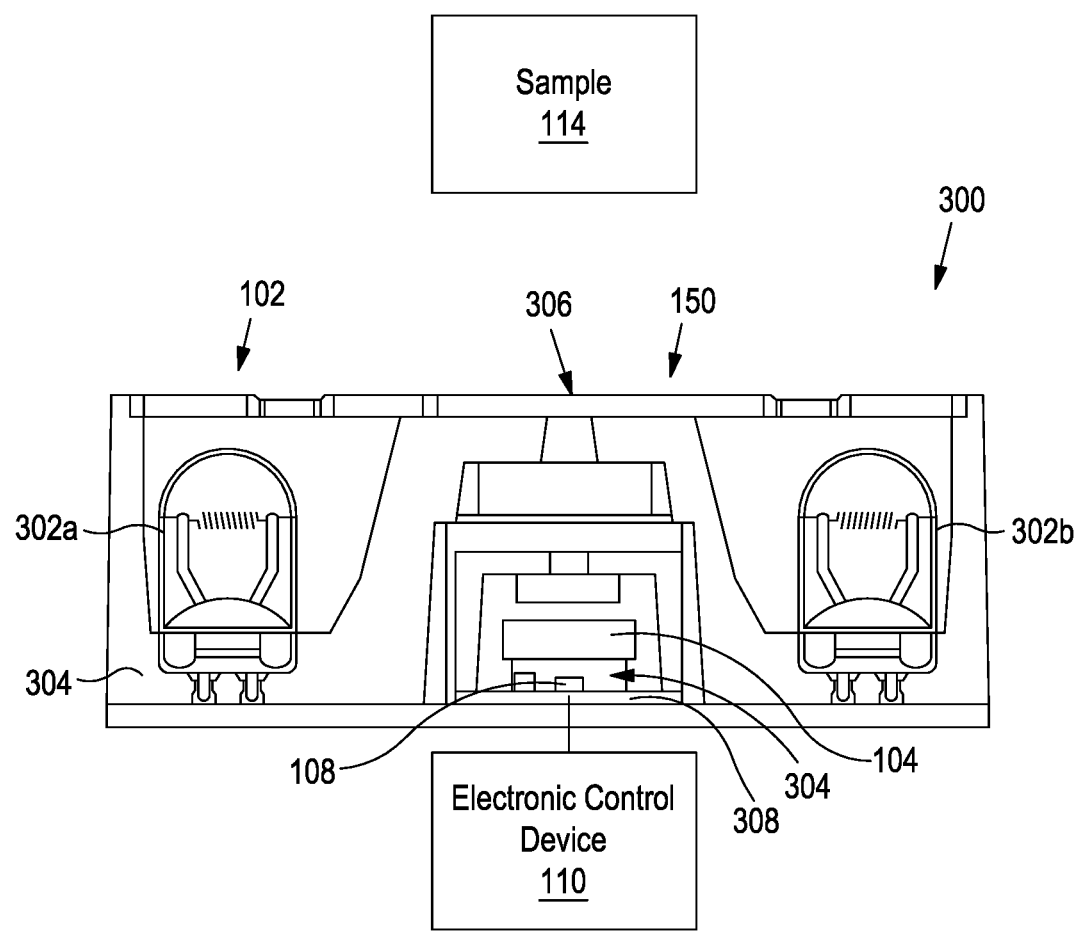
FIG. 3 is schematic diagram of an example spectrometer system.

To enhance its performance, the spectrometer system can self-calibrate its sample measurements to account for these variations. An example spectrometer system 100 for performing self-calibrations is shown in FIG. 3.

The spectrometer system 100 includes a light source 102 having two light emitting elements 302a and 302b. Each of the light emitting elements 302a and 302b can include, for example, one or more incandescent lamps, light emitting diodes (LEDs), vertical cavity surface emitting lasers (VCSELs), organic light emitting diodes (OLEDs), or other devices that selectively generate light.

The light emitting elements 302a and 302b can be configured to emit light according to different wavelengths or ranges of wavelengths and/or according to different spectral distributions. For instance, the light emitting element 302a can be configured to emit reference light having a known spectral distribution (e.g., light having one or more known intensity peaks corresponding to one or more known frequencies in the frequency domain). The reference light emitted from the light emitting element 302a can be used to obtain reference measurements for calibrating sample measurements. In some cases, the light emitting element 302a can include one or more broadband light emitting elements and one or more filters that impart a particular spectral distribution on the emitted light.

Figure 4:
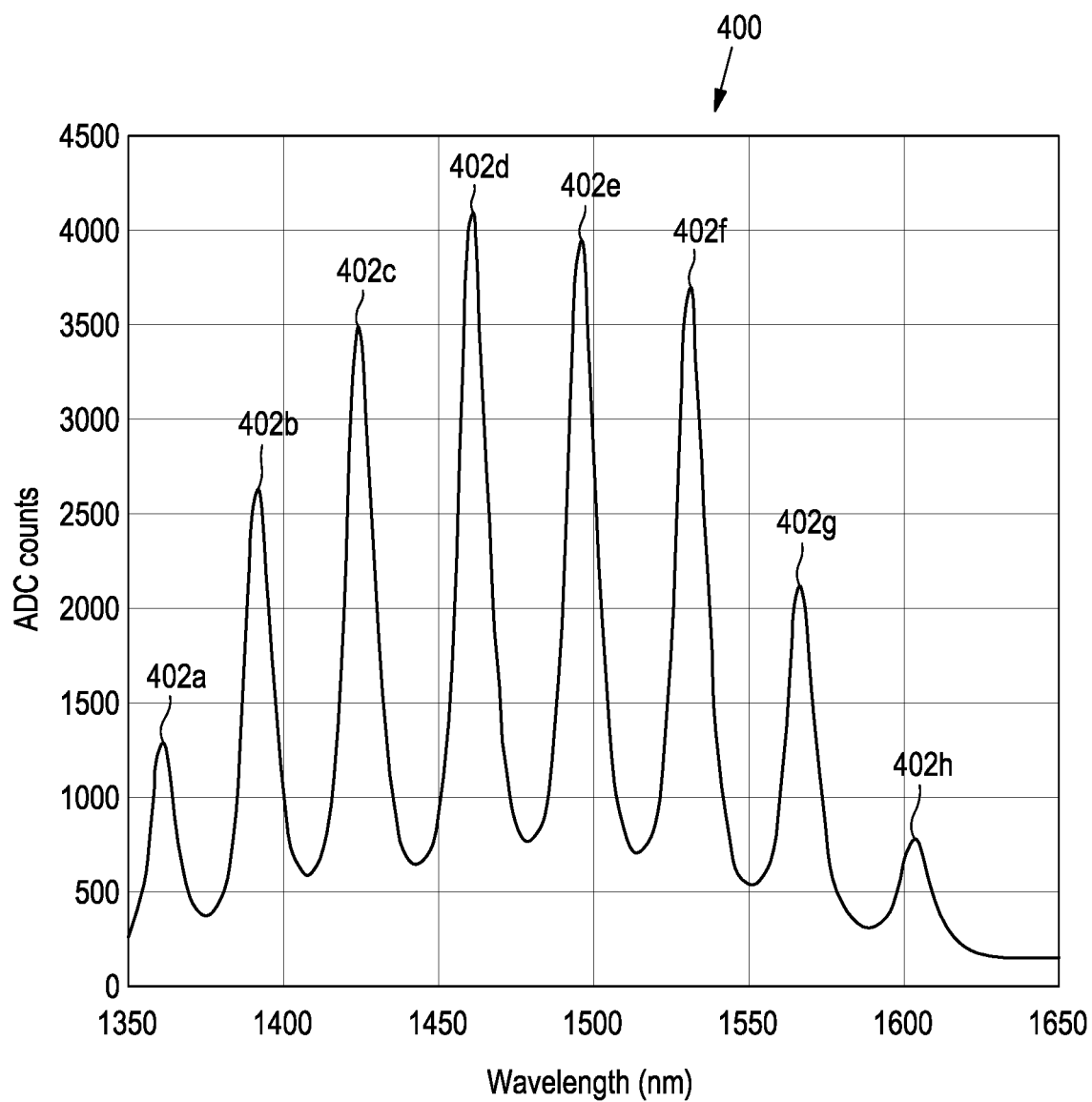
FIG. 4 shows a plot of an example spectral distribution of reference light.

An example spectral distribution 400 of reference light is shown of FIG. 4. In this example, the spectral distribution 400 includes 8 intensity peaks 402a-402h (e.g., local maxima and/or local minima), each corresponding to a respective frequency in the frequency domain. In some cases, some or all of the peaks of the spectral distribution can be evenly distributed with respect to one another. Although a spectral distribution 400 of reference light is shown in FIG. 4, this is merely an example. In practice, other spectral distributions of reference light can be used, either in addition to or instead of that shown in FIG. 4.

The light emitting element 302b emits light suitable for conducting sample measurements (e.g., measurements of a sample, such an object or other subject). In some cases, the light emitting element 302b can emit broadband light (e.g., white or neutral light having a broad optical bandwidth, and/or emission similar to or approximating black body emission, such as that emitted by a bulb filament). In some cases, the light emitted by the light emitting element 302b can exhibit less intense peaks and/or fewer peaks compared to the reference light emitted by the light emitting element 302a.

The spectrometer system 100 also includes a sensor module 150 having a housing 304 defining a cavity 304 and an aperture 306. Some or all of the components of the sensor module 150 shown in FIG. 3 can be similar to those shown in FIG. 1. For example, the sensor module 150 can include a detector 108 disposed within the cavity 304 (e.g., on a substrate 308), and an interferometer 104 disposed within the cavity between the aperture 306 and the detector 108 (e.g., on the substrate 308). The spectrometer system 100 also includes an electronic control device 110 and a voltage source 106. For ease of illustration, certain components of the spectrometer system 100 have been omitted from FIG. 3.

In an example operation of the sensor module 150, the light emitting element 302a emits reference light (e.g., towards a sample 114). At least some of the reference light reflected by and/or transmitted through the sample travels through the aperture 306 and becomes incident on the interferometer 104. Based on an input voltage generated by the voltage source 106, the interferometer 104 selectively transmits a subset of the returning reference light (e.g., returning reference light within a particular wavelength or range of wavelengths) to the detector 108. The detector 108 measures the characteristics of the subset of the returning reference light, and provides the measurements the electronic control device 110.

As the emitted reference light has particular known characteristics (e.g., having one or more known intensity peaks corresponding to one or more known frequencies in the frequency domain), the subset of the returning reference light may also have particular known characteristics. As an example, the subset of the returning reference light also may exhibit at least a subset of the intensity peaks exhibited by the emitted reference light.

The measurements of the subset of the returning reference light can be used to calibrate the performance of the spectrometer system. For instance, the electronic control device 110 can obtain the measurements of the returning reference light from the detector 108, and compare the measurements against the known properties of the reference light (e.g., pre-determined properties that are recorded in a data record of a storage device). If there are any discrepancies (e.g., the measured intensity peaks do not align with the known intensity peaks of the reference light), the electronic control device 110 can calibrate the measurement data such that it better reflects the known properties of the reference light (e.g., using one or more mathematical fitting algorithms or techniques). As an example, one or more fitting functions can be determined that transform the measured spectral distribution of the returning reference light so that it substantially matches or is otherwise more similar an expected spectral distribution of the returning reference light (e.g., corresponding to the known properties of the reference light). In some cases, the calibration can be performed using one or more regression techniques, such as polynomial regression. In some cases, the calibration can be stored (e.g., recorded in a data record of a storage device) for future retrieval and use.

These calibrations can be applied to one or more sample measurements to improve the accuracy and/or precision of a spectrometer system's sample measurements. As an example, the spectrometer system can use the light emitting element 302b to emit sample light (e.g., broadband light) towards the sample 114. At least some of the sample light reflected by and/or transmitted through the sample travels through the aperture 306 and becomes incident on the interferometer 104. Based on an input voltage generated by the voltage source 106, the interferometer 104 selectively transmits a subset of the returning sample light (e.g., returning sample light within a particular wavelength or range of wavelengths) to the detector 108. The detector 108 measures the characteristics of the subset of the sample reference light, and provides the measurements the electronic control device 110. The electronic control device 110 can apply the one or more previously determined fitting functions to transform the measured spectral distribution of the returning sample light to a calibrated spectral distribution. In some cases, the electronic control device 110 can apply substantially the same or similar regression techniques and fitting parameters as those employed during the reference light calibration process (e.g., polynomial regression).

In some cases, the spectrometer system can obtain measurements of reference light prior to obtaining one or more measurements of sample light. As an example, the spectrometer system can obtain one or more measurement of reference light, and determine a suitable calibration based on the measurements. The spectrometer system can subsequently obtain one or more measurements of sample light, and apply the same or otherwise similar calibration to each of the measurements of sample light. In some cases, the spectrometer system can obtain a measurement of reference light prior to each measurement of sample light (e.g., such that a new calibration is determined prior to each measurement of sample light). In some cases, the spectrometer system can obtain a measurement of reference light periodically (e.g., prior to every $N_1$ number of measurements of sample light and/or every $N_2$ minutes, such that a new calibration is determined and applied for every $N_1$ measurement of sample light and/or every $N_2$ minutes). In some cases, the spectrometer system can obtain a measurement of reference light when the device is turned on or initiated (e.g., as a part of a startup process), and apply the determined calibration to one or more subsequent sample measurements.

In some cases, the spectrometer system can obtain measurements of reference light subsequent to obtaining one or more measurements of sample light. As an example, the spectrometer system can obtain one or more measurement of sample light, and subsequently determine a suitable calibration based on one or more measurements of reference light. The spectrometer system can retroactively apply the determined calibration to the one or more previously obtained measurements of sample light.

Figure 5:
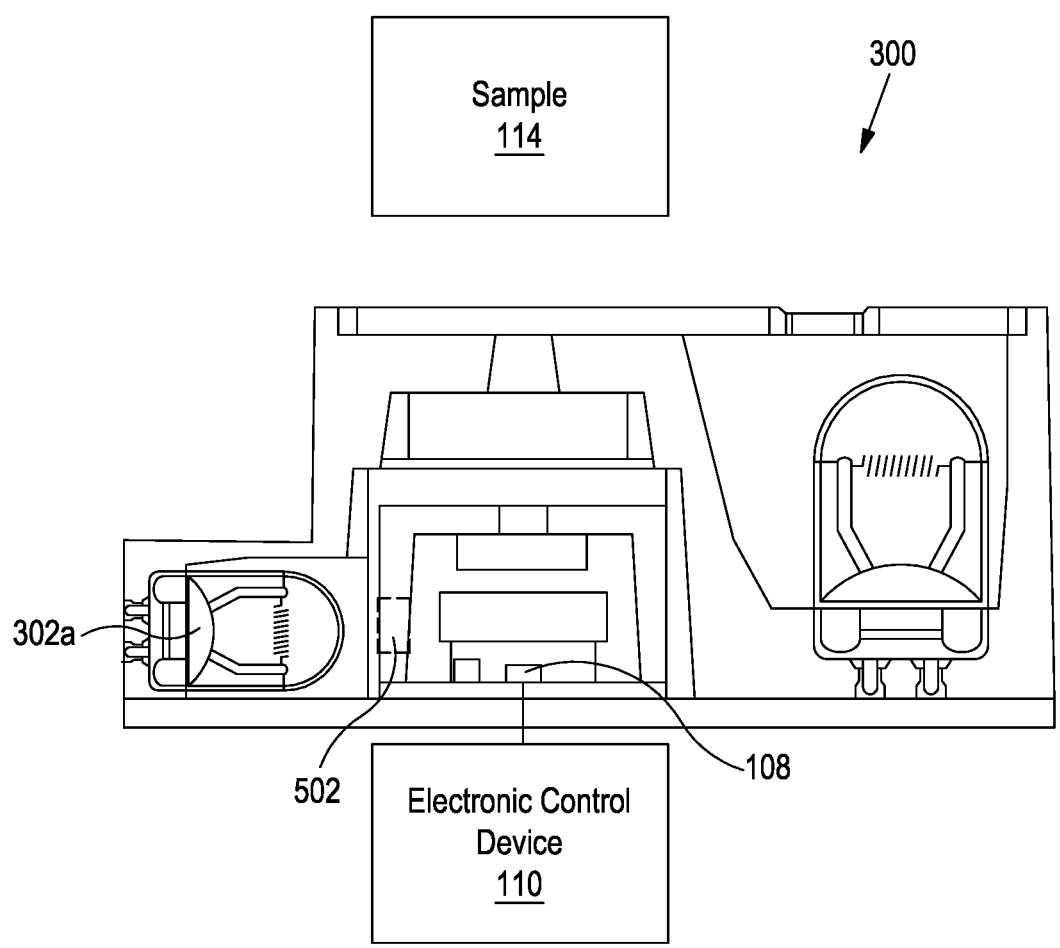
FIG. 5 is schematic diagram of another example spectrometer system.

In the example shown in FIG. 3, the light emitting element 302a emits reference light towards to sample 114, which in turns reflects and/or transmits some of the reference light towards the detector 108. However, this need not always be the case. In some implementations, a light emitting element 302a can emit reference light directly or substantially directly towards the detector 108. As an example, FIG. 5 shows another spectrometer system 500. The spectrometer system 500 is generally similar to the spectrometer system 300 shown in FIG. 3. However, in this example, the light emitting element 302a is configured to direct reference light such that it impinges on the detector 108 without first reflecting from and/or transmitting through a sample 114. In some cases, this can be achieved using a light guide 502 (e.g., one or more light pipes, lenses, or other optical elements provided on the housing) that optically couples the light emitting element 302a and the detector 108.

Example Processes

Figure 6:
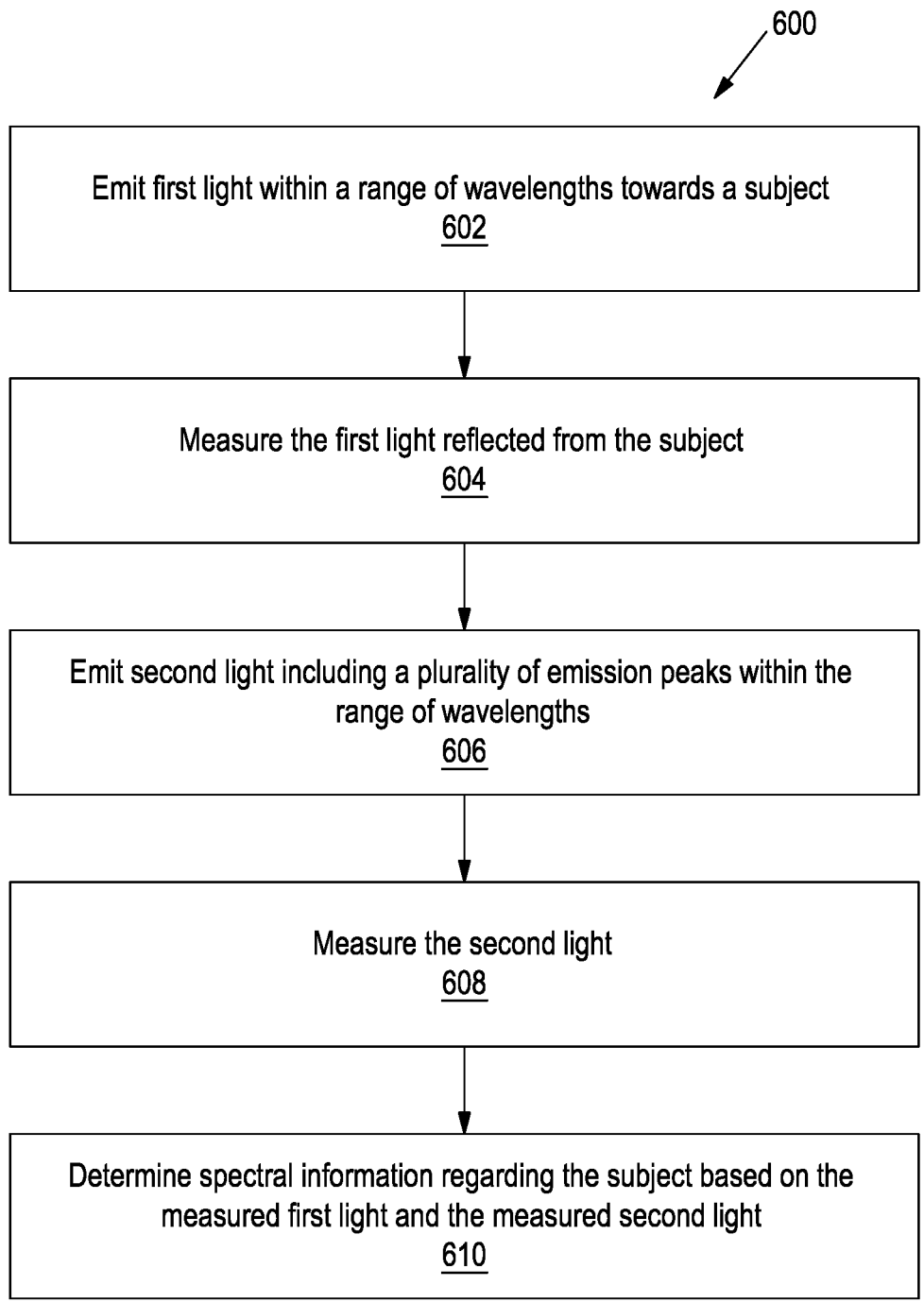
FIG. 6 is a flow chart diagram of an example process for measuring a spectral distribution of light reflected from and/or transmitted through a sample

An example process 600 for using a spectrometer system is shown in FIG. 6. The process 600 can be performed to measure a spectral distribution of light reflected from and/or transmitted through a sample. In some implementations, the process 600 can be performed by one or more of the spectrometer systems and/or sensor modules shown in FIGS. 1, 3, and 5.

In the process 600, first light within a range of wavelengths is emitted towards a subject (step 602). In some implementations, the first light can be broadband light. As an example, referring to FIG. 1, first light can be emitted by a light source 102 towards a sample 114. As another example, referring to FIGS. 3 and 5, first light can be emitted by a light emitting element 302b towards a sample 114.

The first light reflected from the subject is measured (step 604). As an example, referring to FIG. 1, the first light reflected from the sample 114 can be measured by the sensor module 150 (e.g., measured using the interferometer 104 and the detector 108, and processed by the electronic control device 110).

Second light including a plurality of emission peaks within the range of wavelengths is emitted (step 606). In some implementations, the wavelengths of the plurality of emission peaks can be evenly distributed. An example spectral distribution of the secondary light is shown, for instance, in FIG. 4.

The second light is measured (step 608). In some implementations, the second light can be emitted towards the subject, and the second light reflected from the subject can be measured. As an example, referring to FIG. 3, the second light can be emitted by a light emitting element 302a towards a sample 114, and the second light reflected from the sample 114 can be measured by the sensor module 150 (e.g., using the interferometer 104 and the detector 108).

In some implementations, the second light can be emitted towards a light guide, and second light emitted by the light guide can be measured. As an example, referring to FIG. 5, the second light can be emitted by a light emitting element 302a towards light guide 502, and the second light can be measured by the sensor module 150 (e.g., using the interferometer 104 and the detector 108).

Spectral information regarding the subject is determined based on the measured first light and the measured second light (step 610). In some implementations, determining the spectral information regarding the subject can include identifying one or more emission peaks of the plurality of emission peaks in the measured second light, and transforming a representation of the measured first light based on the identified one or more emission peaks. The representation of the measured first light can include a data record indicating spectral components of the measured first light.

In some implementations, determining the spectral information regarding the subject can include determining a difference between the measured second light and the measured first light, and transforming a representation of the measured first light based on the difference. The representation of the measured first light can include a data record indicating spectral components of the measured first light.

Example techniques for determining the spectral information (e.g., including transformation techniques) are described with respect to FIGS. 3-5.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the spectrometer systems 100, 300 and 500 and/or sensor module 150 (e.g., the electronic control device 110) can be implemented using digital electronic circuitry, or in computer software, firmware, or hardware, or in combinations of one or more of them. In another example, the process shown in FIG. 7 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 7:
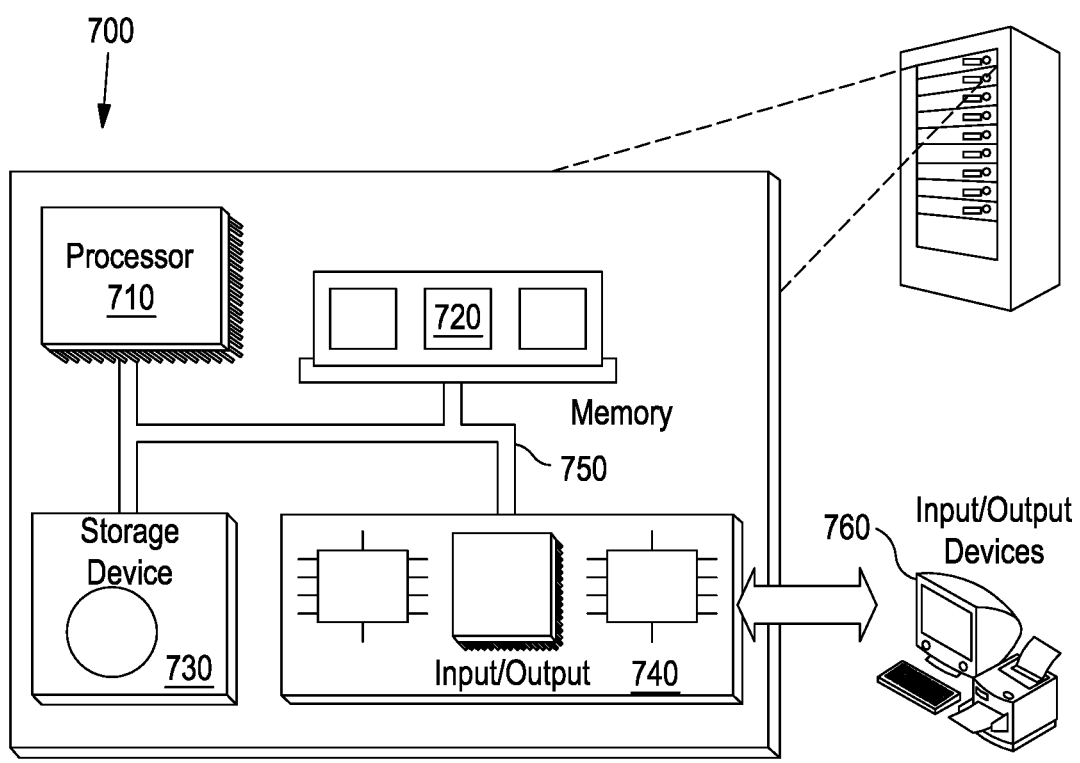
FIG. 7 is a schematic diagram of an example computer system.

FIG. 7 shows an example computer system 700 that includes a processor 710, a memory 720, a storage device 730 and an input/output device 740. Each of the components 710, 720, 730 and 740 can be interconnected, for example, by a system bus 750. In some implementations, the computer system 700 can be used to control the operation of a spectrometer. For example, the electronic control device 110 shown in FIGS. 1, 3, and 5 can include a computer system 700 to control the operation of one or more components of a spectrometer and/or process measurement data. The processor 710 is capable of processing instructions for execution within the system 700. In some implementations, the processor 710 is a single-threaded processor, a multi-threaded processor, or another type of processor. The processor 7710 is capable of processing instructions stored in the memory 720 or on the storage device 730. The memory 720 and the storage device 730 can store information within the system 700.

The input/output device 740 provides input/output operations for the system 700. In some implementations, the input/output device 740 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

The invention claimed is:
1. A system comprising:
a first light source;
a second light source;
a photodetector; and
an electronic control device operable to:
cause the first light source to emit first light within a range of wavelengths towards a subject;
measure, using the photodetector, the first light reflected from the subject;

cause the second light source to emit second light, the second light comprising a plurality of emission peaks within the range of wavelengths;

measure, using the photodetector, the second light; and determine, based on the measured first light and the measured second light, spectral information regarding the subject;

wherein the electronic control device is operable to determine the spectral information regarding the subject by:

identifying one or more emission peaks of the plurality of emission peaks in the measured second light; and transforming a representation of the measured first light based on the identified one or more emission peaks.

2. The system of claim 1, wherein the first light is broadband light.

3. The system of claim 1, wherein the wavelengths of the plurality of emission peaks are evenly distributed.

4. The system of claim 1, wherein the representation of the measured first light comprises a data record indicating spectral components of the measured first light.

5. The system of claim 1, wherein the electronic control device is operable to determine the spectral information regarding the subject by:

determining a difference between the measured second light and the measured first light; and transforming a representation of the measured first light based on the difference.

6. The system of claim 5, wherein the representation of the measured first light comprises a data record indicating spectral components of the measured first light.

7. The system of claim 1, wherein the electronic control device operable to:

cause the second light source to emit the second light towards the subject, and measure, using the photodetector, the second light reflected from the subject.

8. The system of claim 1, wherein the electronic control device operable to:

cause the second light source to emit the second light towards a light guide optically coupled to the photodetector, and measure, using the photodetector, the second light emitted from the light guide.

9. The system of claim 1, wherein the second light source comprises one or more dielectric coating filters and a broadband light emitting element.

10. The system of claim 9, wherein the broadband light emitting element comprises an incandescent lamp.

11. The system of claim 1, further comprising a host device, and wherein the first light source, the second light source, the photodetector, and the electronic control device are disposed, at least in part, in the host device.

12. The system of claim 11, wherein the host device is at least one of a smart phone or a wearable device.

13. A method comprising:

emitting first light within a range of wavelengths towards a subject;

measuring the first light reflected from the subject;

emitting second light, the second light comprising a plurality of emission peaks within the range of wavelengths;

measuring the second light; and determining, based on the measured first light and the measured second light, spectral information regarding the subject;

wherein determining the spectral information regarding the subject comprises:

identifying one or more emission peaks of the plurality of emission peaks in the measured second light; and transforming a representation of the measured first light based on the identified one or more emission peaks.

14. The method of claim 13, wherein the first light is broadband light.

15. The method of claim 13, wherein the wavelengths of the plurality of emission peaks are evenly distributed.

16. The method of claim 13, wherein the representation of the measured first light comprises a data record indicating spectral components of the measured first light.

17. The method of claim 13, wherein determining the spectral information regarding the subject comprises:

determining a difference between the measured second light and the measured first light; and transforming a representation of the measured first light based on the difference.

18. The method of claim 17, wherein the representation of the measured first light comprises a data record indicating spectral components of the measured first light.

19. The method of claim 13, wherein emitting second light comprises emitting the second light towards the subject, and wherein measuring the second light comprises measuring the second light reflected from the subject.

20. The method of claim 13, wherein emitting second light comprises emitting the second light towards a light guide, and wherein measuring the second light comprises measuring the second light emitted from the light guide.

* * * * *